July 25, 1967 S. ORSEN 3,333,262

SIGNAL CONVERSION APPARATUS

Filed June 16, 1964

4 Sheets-Sheet 1

INVENTOR.
STEFAN ORSEN

BY

Eli Weiss

ATTORNEY

INVENTOR.
STEFAN ORSEN
BY Eli Weiss
ATTORNEY

INVENTOR.
STEFAN ORSEN

BY

Eli Weiss
ATTORNEY

INVENTOR.
STEFAN ORSEN
BY
Eli Weiss
ATTORNEY

United States Patent Office 3,333,262

Patented July 25, 1967

3,333,262

SIGNAL CONVERSION APPARATUS

Stefan Orsen, Jersey City, N.J., assignor to American Radiator & Standard Sanitary Corporation, New York, N.Y., a corporation of Delaware Filed June 16, 1964, Ser. No. 375,570
14 Claims. (Cl. 340—347)

ABSTRACT OF THE DISCLOSURE

An analog to digital conversion system providing conversion substantially free of variations in parameters such as temperature. The conversion is accomplished by generating positive and negative signals proportional to the analog input which on comparison to reference signals control the opening and closing of gates thereby allowing a number of reference pulses proportional to the analog input to pass through to a counter.

This invention relates in general to an information translation system of the type which converts an analog voltage into pulse count information for application to a visual output. More particularly, the invention relates to an improved temperature stabilized solid state analog-to-digital converter circuit employing novel transistorized compensated circuitry.

It is well-known that D-C transistorized amplifiers are subject to drift caused primarily by random changes in temperature. In all transistors, temperature has a marked effect upon many of the operating characteristics. The zero-emitter collector current, $I_{co}$, increases exponentially with temperature, and the short-circuit current amplification, $\alpha$, changes depending on the physical construction of the transistor. Also the collector resistance will drop appreciably due to temperature increases.

Temperature effects coupled with individual physical imperfection in transistors have heretofore prevented high accuracy, high dependability, analog-to-digital converter circuitry from being practical.

It is accordingly a primary object of the present invention to provide a new and improved comparison circuit utilizing semi-conductor devices in an improved method of operation.

It is another object of the present invention to provide circuit means for converting an analog input voltage into positive and negative analog signal representation and means for converting each analog signal representation into a separate analog time pulse which, when combined by gating means into a single analog time interval, provides an extremely accurate and temperature stable analog time base proportional to the analog input voltage.

It is another object of the present invention to provide a novel comparison circuit employing a linear sweep voltage and two separate reference voltages to create a time interval which is totally independent of the start or stop of the linear sweep voltage.

It is still another object of the present invention to provide an analog-to-digital converter wherein there is obtained a digital pulse count output proportional to the absolute value of the magnitude of an analog voltage input permitting direct coupling to a recording device of a digital voltmeter.

In accordance with the present invention, there is provided a transistorized analog-to-digital converter for converting an analog voltage input into a digital pulse count output which in general comprises: means for differentially amplifying the analog voltage input to provide a positive and a negative magnitude analog signal proportional to the voltage input, means providing a stable source of pulses to be counted, a linear sawtooth generator coupled to a first and to a second comparison circuit for converting each analog signal into a separate timed pulse proportional to the magnitude of each analog signal, and means for gating said stable sources of pulses to an output counter during the interval between said timed pulses to provide a digital pulse count output indicative of the magnitude of the analog voltage input.

For a better understanding of the invention together with other objects and advantages thereof, reference is made to the following description taken in connection with the accompanying drawings in which.

Figure 1:
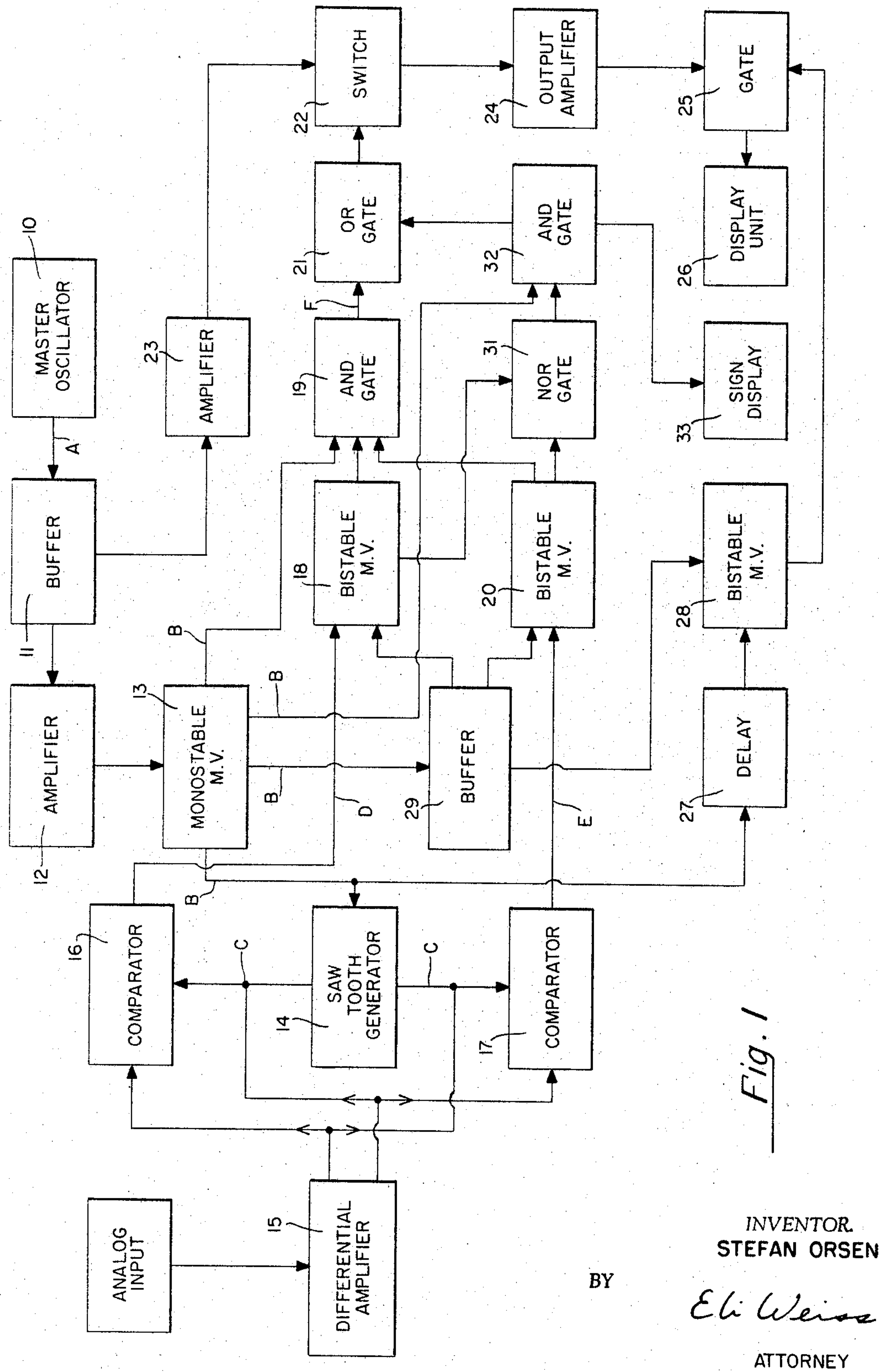
FIG. 1 is a block diagram of the preferred embodiment of the invention.

Referring now to the drawings wherein FIG. 1 shows in block diagram the principle of the present system. A highly stable source of clock pulses generated at the master oscillator 10 is applied to an impedance changing buffer 11 before being applied to an amplifier stage 12. Amplifier stage 12 drives a monostable multivibrator 13 adjusted to maintain its quasi-stable state for a count of approximately 1800 clock pulses. One of the outputs from the multivibrator 13, waveform B, drives linear sawtooth generator 14 to produce a sawtooth waveform C for comparison with a reference voltage. An analog input voltage to be measured is amplified in a differential amplifier 15 to produce a positive and a negative representation of the analog voltage for application to the comparison circuits. The positive signal representation is applied to a first comparison circuit 16 to produce a start pulse, and the negative signal representation is applied to a second comparison circuit 17 to produce a stop pulse. The start pulse is fed to a resettable multivibrator switch 18 which generates a pulse at the input of AND gate 19 causing an output signal. The stop pulse is fed to another resettable multivibrator switch 20 which ceases to generate an input to AND gate 19 causing the output to stop. The time of output T of AND gate 19 is directly proportional to the analog voltage being measured and is applied as a pulse through OR gate 21 to switch 22. A continuous sequence of highly stable equally spaced pulses from oscillator 10 is amplified by stage 23 and applied to switch 22 so that the pulse count train is gated during time T to an output amplifier 24. Trains of pulses produced at amplifier 24 and applied to gate 25 are occurring very rapidly and it is desirable to select only one of these trains for presentation to the display unit 26 such as a visual readout counter. Waveform B from multivibrator 13, beginning at the start of every sawtooth waveform C, is applied to delay circuit 27 which allows one of a plurality of such pulses to SET bistable multivibrator 28 every few seconds. Multivibrator 28 is connected to gate 25 so that the set condition enables gate 25 to pass a pulse train to the display unit 26. At the end of each sawtooth waveform, after a pulse count, multivibrator switches 18, 20 and 28 are RESET by a pulse from monostable multivibrator 13 shaped in buffer 29.

When the analog input to the differential amplifier changes polarity, the start pulse occurs after the stop pulse creating a blocked condition at AND gate 19. During time T, if polarity is reversed, there is no output from either multivibrator 18 or 20; this condition creates a pulse at NOR (not OR) gate 31 which is applied to AND gate 32 with a pulse from multivibrator 13, occurring during the sawtooth waveform. The output from AND gate 32 may be applied to switch 22 to gate the pulse train, and may also be applied to sign display 33 to indicate the polarity of the voltage magnitude indicated by display unit 26.

Figure 2:
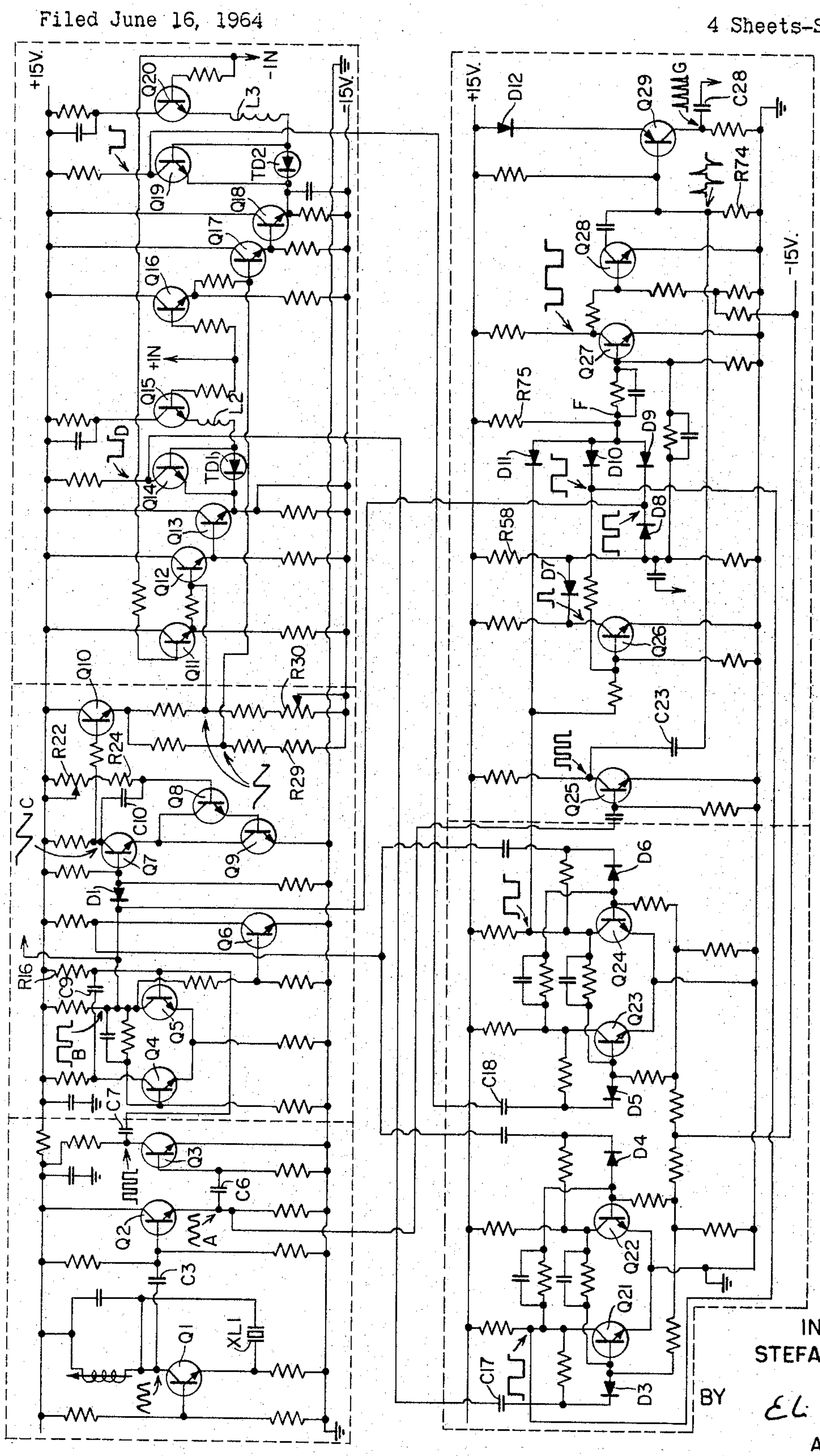
FIG. 2 is a schematic diagram illustrating the detailed circuitry of the analog-to-digital converter and the novel voltage comparator.

Referring now to FIG. 2 which shows the detailed circuitry of the analog-to-digital converter and its waveforms. Oscillator 10, comprising transistor Q1 and quartz crystal XL1, is coupled by capacitor C3 to transistor Q2 of buffer 11. The output of transistor Q2, waveform A, is coupled to transistor Q3 by capacitor C6. Each positive excursion of waveform A switches the normally OFF transistor Q3 of amplifier 12 into the ON condition creating a train of square wave pulses in synchronism with the waveform A. In its stable state, transistor Q4 is OFF and transistor Q5 of monostable multivibrator stage 13 is ON. The output of transistor Q3 is taken from the collector and coupled through capacitor C7 to the base of transistor Q5 where a negative going excursion of a square wave pulse switches transistor Q5 OFF and transistor Q4 ON; immediately the collector of transistor Q4 drops from 15 volts down to .35 volt and drives the base of transistor Q5 through coupling capacitor C9 down to minus 14.2 volts. The base of transistor Q5 now rises exponentially toward the supply voltage from minus 14.2 volts as capacitor C9 discharges through resistor R16. When the base voltage of transistor Q5 reaches .47 volt it again switches ON causing transistor Q4 to switch OFF. After switching and recovering monostable multivibrator stage 13 is triggered again as before repeating the cycle and generating waveform B at the collector of transistor Q5. This quasi-stable state (Q4 ON, Q5 OFF) exists for approximately 18 milliseconds as determined by resistor R16, capacitor C9 and the above mentioned voltages of the preferred embodiment described.

Waveform B is employed to synchronize the gating circuits and drive the linear sweep or sawtooth generator 14 comprising transistors Q7, Q8 and Q9. A positive directed waveform B is applied as a gating signal to the base of transistor Q7 of the linear sweep generator 14 through diode D1. Transistors Q7, Q8 and Q9 are normally OFF and are switched ON by waveform B. When transistor Q5 is ON, waveform B is at or near ground potential, the base of transistor Q7 is then clamped to ground through diode D1. During the quasi-stable state of multivibrator 13, diode D1 is back-biased and the base of transistor Q7 rises sufficiently to cause all three transistors Q7, Q8 and Q9 to conduct heavily so that capacitor C10 is charged through transistors Q7 and Q9 and resistors R22 and R24. Variable resistor R22 is employed to adjust the capacitor charging current and to change the "time vs voltage" slope of the sawtooth waveform.

Accuracy of the system requires a linear sawtooth waveform. The charging rate of capacitor C10 may be shown to be $dVc/dt=ic/C10$. Since capacitor C10 is already constant, the rate of change of the sawtooth waveform C may be made constant if *ic* is held constant. This is accomplished by operating the transistors above the knee of their voltage curve so that they perform as constant current devices.

The collector output of transistor Q7, waveform C, is transformed from high to low impedance by emitter follower transistor Q10 before being applied to the two comparison circuits 16 and 17. For purposes of this explanation comparison circuit 16 includes transistors Q11 through Q15 and comparison circuit 17 includes transistors Q16 through Q20.

Consider first the operation of comparison circuit 16 having the downward directed amplified waveform C applied to the base of transistor Q12. An analog voltage to be measured is amplified in the differential amplifier 15 of FIG. 4 to produce both a negative and a positive signal representative of the analog voltage input. The negative signal is applied to the base of transistor Q11 causing it to be added to the negative going (downward directed) waveform C as the input to the base of transistor Q12. These combined inputs are applied to the emitter follower transistor Q13 of the first comparator stage so that sawtooth waveform C drives the base of emitter of transistor Q13 towards ground. At the other end of the comparison circuit the positive signal to be compared is applied to the base of transistor Q15 of the first comparator stage. Connected in series between the emitters of transistors Q13 and Q15 is a tunnel diode TD1. Assuming the analog voltage to be measured is constant at the time of measurement, then the negative and positive signals representative of this voltage are constant. When the voltage drop across tunnel diode TD1 reaches approximately 55 millivolts it is triggered causing transistor Q14 to switch ON and its collector potential to drop sharply generating waveform D. This downward extending waveform D occurs when the difference between the emitter of transistor Q15 and the emitter of transistor Q13 reaches a critical voltage sensed by the tunnel diode TD1. The time of occurrance of the leading edge of this waveform is related in time to the original analog input voltage and it may be used as a start pulse for the gating circuits. The operation of comparison circuit 17, including transistors Q16 and Q21 and tunnel diode TD2, is identical to comparison circuit 16 explained above.

A "zero set" compensation resistor R30 is provided in the emitter load circuit of transistor Q10, supplying comparison circuit 16, so that both comparison circuits may be critically adjusted to produce an output signal at the same time when there is no analog input signal received from the amplifier. Resistance element R29, having a positive temperature coefficient, compensates for thermal variations after the "zero set" of emitter follower Q10.

Assuming no polarity change, transistor Q14 in comparison circuit 16 switches ON before transistor Q19 in comparison circuit 17, permitting waveform D, generated at transistor Q14, to be employed as a "start pulse" and waveform E generated at transistor Q19 to be employed as a "stop pulse" to provide a measure of the lapsed time T between waveforms. The output of transistor Q14 is differentiated by capacitor C17 and applied as a negative trigger to transistor Q21 in multivibrator switch 18 causing transistor Q21 to switch from ON to OFF. This switching causes the collector of transistor Q21 to rise from approximately ground to 15 volts generating the "start pulse." The collector of transistor Q21 is connected directly to AND gate 19 comprising diodes D9, D10, D11 and resistor R75. At the time of the "start pulse," doides D9 and D11 are back-biased by transistors Q5 and Q26, respectively, so that as soon as transistor Q21 switches OFF, gate 19 goes HIGH and the base of transistor Q27 in OR gate 21 receives a positive pulse, which switches transistor Q27 into conduction. The collector of transistor Q27 is coupled to the base of transistor Q28 of switch 22 so that the downward directed output of transistor Q27 switches transistor Q28 from ON to OFF for a time duration T. At any other time transistor Q28 is conducting heavily and shorted to ground. Clock pulses, waveform A, generated at oscillator 10 and buffer 11 are constantly being amplified at transistor Q25 of amplifier 23, then differentiated by capacitor C23 and resistor R74, and applied to the collector of transistor Q28 in switch 22.

During the time duration T, waveform F, has transistor Q28 switched OFF and the negative trigger pulses from the collector of transistor Q25 are not shorted to ground but arrive at the base of transistor Q29 in output amplifier 24 causing a train of positive pulses to appear as a pulse train output, waveform G, at the collector of transistor Q29. The number of pulses in waveform G is directly proportional to the analog input voltage and may be calibrated for direct reading of the analog voltage input.

One of the features of the present system is the high temperature stability of the two comparison circuits 16 and 17. This feature may be explained by a detailed examination of the first comparator stage and more specifically transistors Q13 and Q15 and their associated circuitry. The tunnel diode TD1, in series between the emitters of transistors Q13 and Q15, is temperature-stable at the point of switching, thus, the voltage drop at the switching point ($V_{TD1}$) may be considered to be constant.

The input voltage at the base of transistor Q15 ($V_{b15}$) is the positive signal from the amplifier, thus, for purposes of this discussion, is considered constant. The input voltage at the base of transistor Q13 ($V_{b13}$) is the amplified sum of the sawtooth waveform C plus the negative signal, both of which are assumed constant for this discussion to illustrate that the same analog voltage input to the comparison circuits will achieve the same time lapse, resulting in the same pulse count, under different temperature conditions. Assuming the inputs to transistors Q13 and Q15 to be considered constant, the first comparator stage may be examined to show that it is only affected by one current condition which is compensated for by the second comparator stage.

Summing the voltage in the circuit loops it may be shown that:

$$V_{b15}-V_{b13}=V_{be15}-V_{be13}+I_{b15}R_{b15}-I_{b13}R_{b13}+V_{TD1}+I_{e15}R_{e15}$$

where:

$V_{b15}$ is the base voltage of transistor Q15
$V_{b13}$ is the base voltage of transistor Q13
$V_{be15}$ is the base-emitter voltage of transistor Q15
$V_{be13}$ is the base-emitter voltage of transistor Q13
$I_{b15}$ is the base current of transistor Q15
$R_{b15}$ is the base resistance of transistor Q15
$I_{b13}$ is the base current of transistor Q13
$R_{b13}$ is the base resistance of transistor Q13
$I_{e15}$ is the emitter current of transistor Q15
$R_{e15}$ is the emitter resistance of transistor Q15
$V_{TD1}$ is the voltage drop at the switching point of tunnel diode TD1.

The term $V_{be15}-V_{be13}$ is expressed as a difference; likewise, the term $I_{b15}R_{b15}-I_{b13}R_{b13}$ is expressed as a difference. So long as the difference between these terms remains constant there is no requirement that they remain equal. Variations of these voltage differences due to thermal effects in the coupled emitter configuration are self-compensating and these terms may be disregarded as having any effect on the equation.

The term $I_{e15}R_{e15}$ is equal to $$\frac{(I_{b15}+I_{co15})}{1-\alpha_{15}}R_{e15}$$

where:

$I_{co15}$ is the collector current of transistor Q15
$\alpha_{15}$ is the collector-emitter current amplification factor of transistor Q15.

$I_{b15}$ is made negligible by coupling it to a high impedance source. The term $R_{e15}$ includes the choke L2 and the emitter leads; these may be assumed constant for the A.C. signal variations are negligible. The amplification factor $\alpha_{15}$ is constant for small current changes. Thus, the only term remaining which has not been compensated for, or is unaffected by temperature effects, is the collector current $I_{co15}$ of transistor Q15. However, the temperature variation of the collector current $I_{co20}$ of transistor Q20 has an equal and opposite effect to that of $I_{co15}$. Thus, the voltage drop of tunnel diode $V_{TD1}$ in comparison circuits 16 and 17 is both temperature compensated and temperature stable to a new standard of accuracy.

Figure 3:
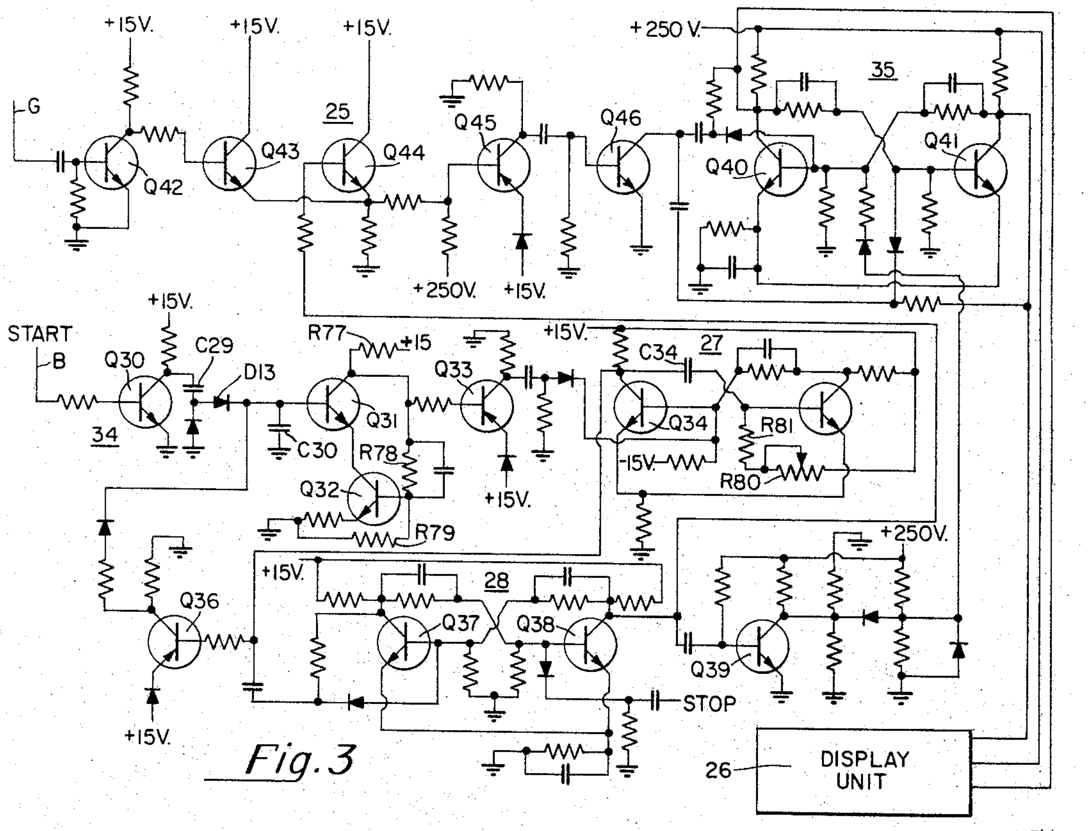
FIG. 3 is a schematic diagram illustrating in detail the delay and gating circuitry for selecting one of a plurality of pulse trains for presentation to a visual display unit.

Output waveform G from transistor Q27 may be employed to drive decade counters, set storage registers or may be fed directly into print-out or read-out devices. One way to utilize this highly accurate rapidly occurring train of digital pulses, representative of analog voltage input, is to select one train of the rapidly occurring trains of pulses at delayed intervals, and gate the selected pulse train into a visual display counter 26, as shown in FIGS. 1 and 3. The collector of transistor Q5 is monostable multivibrator stage 13, which generates waveform B, is coupled as a start gating pulse source to a driver stage 34 comprising transistor Q30. A pulse generated at the collector of transistor Q30 is coupled through capacitor C29 to the base of transistor Q31 of the storage counter. The output of transistor Q30 passes through diode D13 and step charge capacitor C30. Every pulse applied to the base of transistor Q31 increases the charge of capacitor C30 until a level is reached at the application of several pulses which causes both transistors Q31 and Q32 to conduct. Capacitor C30 being rather large discharges rapidly to ground before the next start gating pulse, waveform B. The firing point of transistor Q30 may be critically adjusted by resistors R77, R78 and R79. When the base of transistor Q31 becomes positive with respect to the emitter, transistors Q31 and Q32 conduct generating a negative pulse which is inverted by transistor Q33 and applied as a positive pulse to the base of transistor Q34 in delay multivibrator 27. This pulse triggers delay multivibrator 27 generating a negative pulse at the collector of transistor Q34 which is applied to the base of transistor Q36 to maintain the base of transistor Q31 high in the ON position, thus, shorting the step charging pulses from transistor Q30 to ground until delay multivibrator 27 comes out of its quasi-stable state. This quasi-stable state is determined by the time constant of resistors R80, R81 and capacitor C34 and may be adjusted to produce a delay of several seconds.

The output of transistor Q34 is also applied to the base of transistor Q37 of bistable multivibrator 28 to turn transistor Q37 OFF and transistor Q38 ON generating a negative output pulse at the collector of transistor Q38 which occurs coincident with linear sawtooth waveform C. The base of transistor Q38 is connected to the collector of transistor Q6, which generates a reset pulse coincident with the end of waveform C. Bistable multivibrator 28 is therefore set (transistor Q38 ON) every several seconds coincident in time with waveform C and may be employed to gate one of a plurality of pulse trains, waveform G, to display unit 26. The output from the collector of transistor Q38 is applied as a reset trigger to the base of transistor Q39 so as to generate a reset pulse to reset bi-stable multivibrator 35 in the display unit 26 preparatory to the arrival of a pulse train to be counted.

The positive pulses in the train, waveform G, from output amplifier 24, are applied to the base of transistor Q42 and inverted and applied to normally ON transistor Q43 cutting it OFF. When the output of transistors Q43 and Q38 are applied to NAND (not AND) gate 25 it produces an output pulse at the collector which occurs coincident with the positive pulses in the pulse train, waveform G. Transistors Q45 and Q46 invert the pulse train which is applied to transistors Q40 and Q41 in multivibrator 35. Bistable multivibrator 35 may be employed to drive a beam switching tube or various types of decade counters to provide a visual output display unit.

Figure 4:
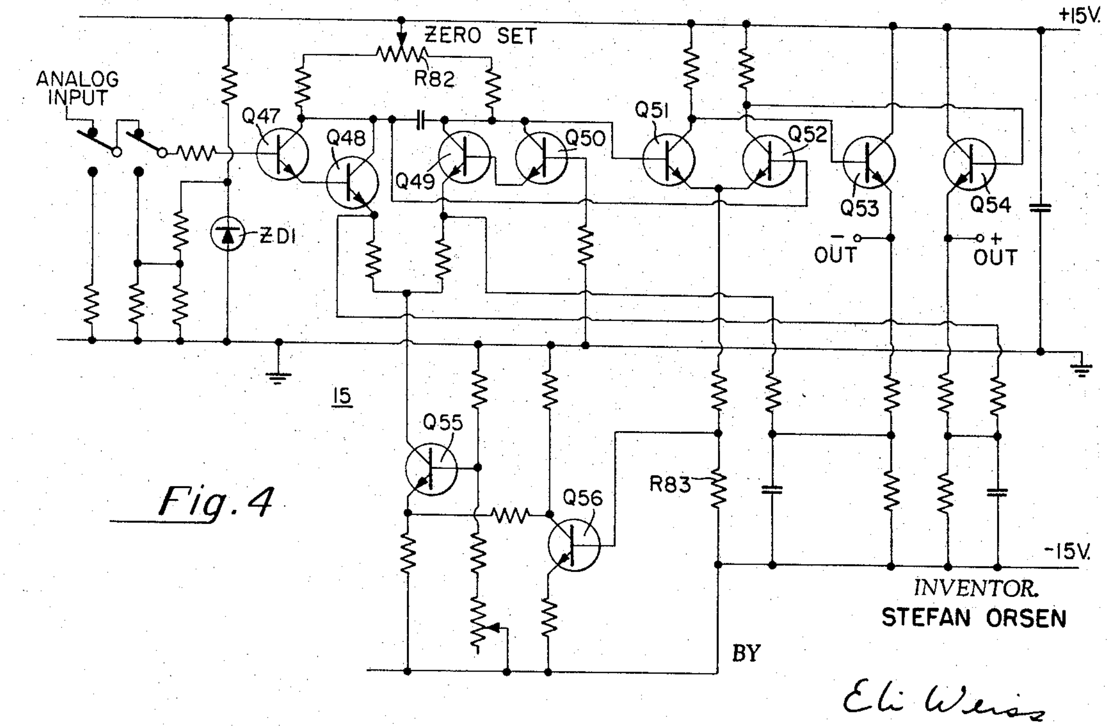
FIG. 4 is a schematic diagram illustrating in detail a differential amplifier for providing positive and negative analog signals representative of the analog voltage input.
Figure 5:
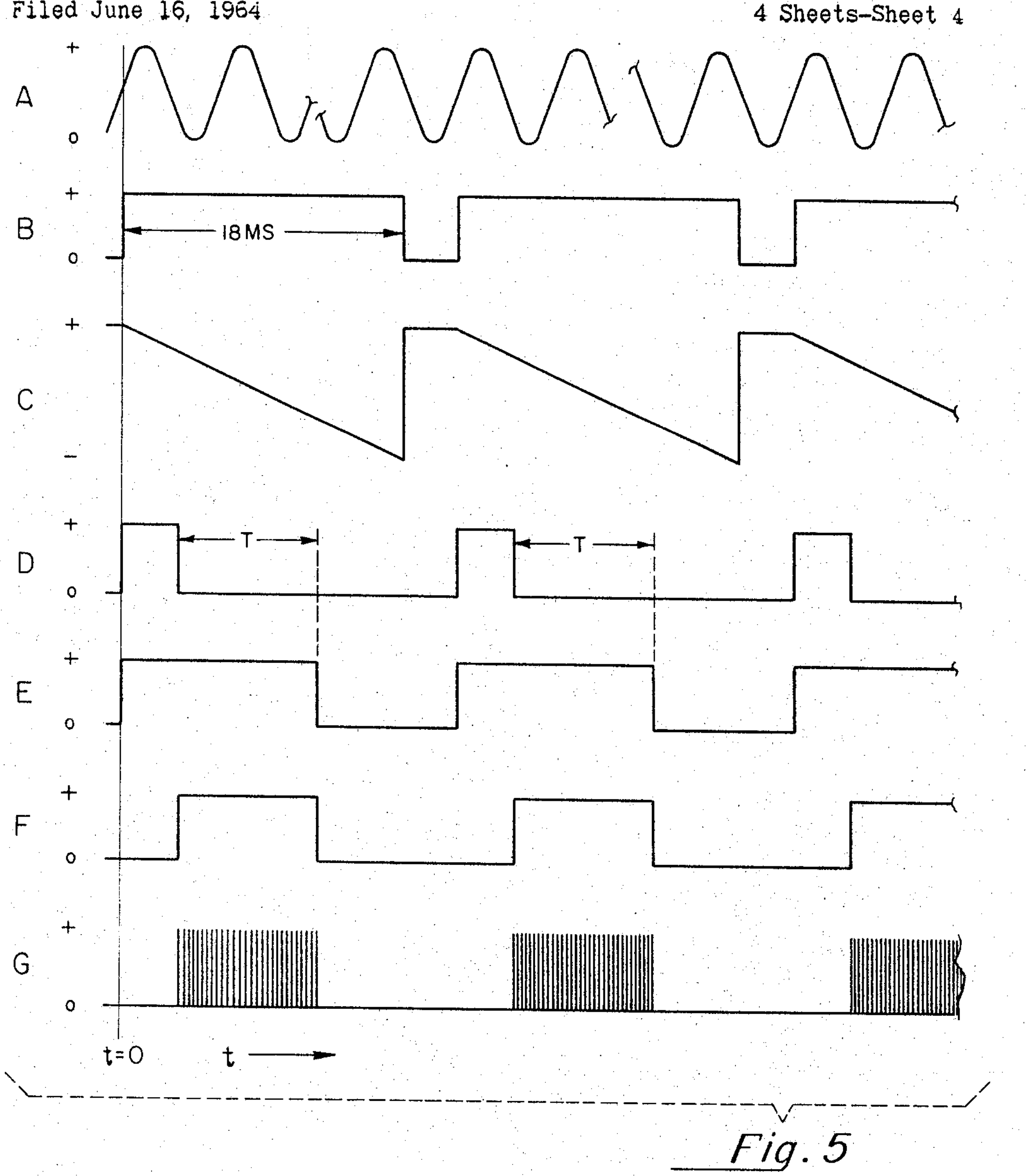
FIG. 5 is a composite diagram of the waveform of signals at various points in the embodiments of FIGS. 1 and 2 which illustrate the operation of the system.

The above described analog-to-digital converter usually requires that the analog voltage to be measured be amplified by a differential amplifier before being applied as an input to the analog-to-digital converter. Referring now to FIG. 4 which shows a highly accurate linear D.C. differential-amplifier having three differential stages. The first stage consists of two Darlington pairs comprising transistors Q47, Q48 and Q49, Q50 operating as an emitter-coupled-differential-amplifier which offers voltage-drift compensation between the two Darlington pairs. The amplifier output from the first stage is connected to a second differential pair comprising transistors Q51 and Q52, also connected as an emitter-coupled-differential-amplifier. The third stage comprises two emitter-follower amplifiers Q53 and Q54 employed as impedance transformers. The negative signal representation, applied to the base of transistors Q11 and Q20, is taken from the emitter of transistor Q53, and the positive signal representation, applied to the base of transistors Q15 and Q16, is taken from the emitter of transistor Q54.

To provide additional stability to the amplifier stage, a constant current source transistor Q55 is connected in the emitter circuit of the first stage. This constant current source may be mounted on a heat sink for additional stability. A potentiometer R82 is connected between the two collector loads and the voltage supply to provide means for balancing out the differences in component values and obtaining zero output when no input is present. The voltage across resistor R83 in the emitter circuit of the second stage, is connected to the transistor Q55 through transistor Q56 for common mode rejection purposes. This three-stage amplifier is extremely linear over the range of outputs for which it is intended to operate with the above described analog-to-digital converter. Any suitable transducer, preferably of matched impedance, could be substituted for the differential amplifier.

Figure 6:
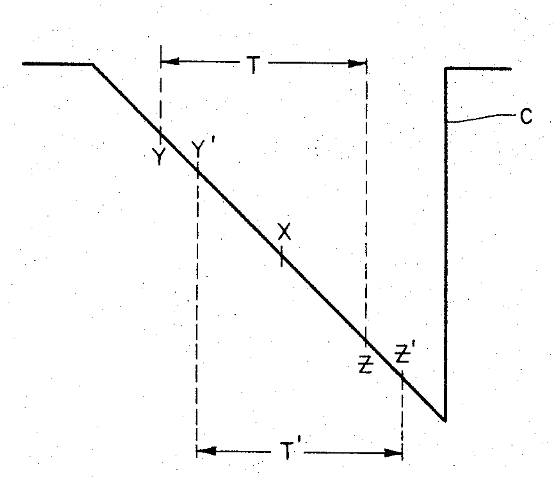
FIG. 6 is a composite diagram of an input waveform to the voltage comparator of FIG. 2 illustrative of the operation of this part of the system.

Throughout the foregoing explanation of FIG. 2, reference was made to the waveforms A to G, shown in an enlarged composite diagram of FIG. 6. The emitter output of transistor Q2 (waveform A) during its positive excursion, switches ON transistor Q3 which causes transistor Q4 to turn ON, and transistor Q5 to turn OFF. Waveform B is generated at the collector of transistor Q5. Waveform A is occurring at a rate of 100,000 pulses per second, and waveform B lasts for 18 milliseconds or for the duration of 1800 cycles of waveform A. In order to illustrate waveform A, it is not drawn to scale relative to waveform B. Waveform B is used as a trigger to generate waveform C and has the same time duration as waveform B. Waveform D, the start pulse, is generated by comparison circuit 16 and always occurs at some time after the start of waveforms B and C. Similarly waveform E, the stop pulse, is generated at some time after the start of waveforms B and C. Time duration T is measured between the beginning of waveform D and the beginning of waveform E. Time duration T, coincident with and measured by waveform F, is employed to operate switch 22 so as to gate a pulse train, waveform G, consisting of a plurality of waveform A pulses, through switch 22 during time T.

Referring now to FIG. 6 showing an enlarged waveform C which may be used to explain the operation of the novel comparison circuits. An amplified waveform C was applied to the base of transistor Q13 in comparison circuit 16, and the positive signal representation of the analog voltage input was applied to the base of transistor Q15. When these two voltages reached a critical voltage drop across tunnel diode TD1, waveform D was generated. Assume that coincidence occurred in time relative to waveform C at point Y. Similarly, amplified waveform C was applied to the base of transistor Q18, and the negative signal representation of the analog voltage input was applied to transistor Q20, generating output waveform E at transistor Q19. Assume that coincidence occurred in time relative to waveform C at point Z. If comparison circuits 16 and 17 are balanced, which may be accomplished by zero set resistor R30, their time of coincidence will occur at ponit X when the analog signal voltage (also the positive and negative signal representations) is zero. The time of coincidence as indicated by the downward extending leading edges of waveforms D and E, is totally independent of the beginning or ending of linear sawtooth waveform C. Point X of FIG. 6 is selected so that it occurs approximately in the center of waveform C, and the analog voltage input to be measured is adjusted so it does not cause points Y and Z to occur close to the beginning or the end of waveform C. Since comparison circuits 16 and 17 are identical, the drift due to the temperature changes or other effects will cause the time of occurrence of waveforms D and E to move in the same direction. For example, if comparison circiut 16 changes its time of occurrence from point Y to point Y′, and comparison circuit 17 changes its time of occurrence from Z to Z′ by the same magnitude and in the same direction, the time difference T and T′ between operating points, always remains the same. As already explained with regard to the detailed explanation of the comparison circuits, only the collector current of transistors Q15 and Q20 can have any appreciable effect due to temperature variations. Since comparison circuits 16 and 17 shift their operating points in the same direction on waveform C due to temperature variations, the time interval T does not change for the same voltage input.

The novel analog digital converter system is therefore adjusted to create a pulse count time interval which is directly proportional to the analog voltage input and occurs at a time completely independent of the time of the beginning or ending of the sawtooth waveform. The comparison circuits are completely and accurately drift compensated against changes in temperature in either direction. While the preferred embodiment shown has a very high degree of accuracy, it may be improved by increasing the linearity of the linear sawtooth waveform and the differential amplifier.

Although the invention is illustrated with a single preferred embodiment, it may be adapted to other uses, employing other types of inputs and outputs. It is apparent that the present invention provides a transistorized analog-to-digital convertor substantially linear in response, and free from measurable drift-induced errors. Having explained the novel features, various modifications and changes will suggest themselves to those skilled in the art without departing from the scope of the invention, some of the novel features of which are defined in the appended claims.

What is claimed is:

1. The method for converting an analog voltage input to a digital pulse count indicative of the magnitude of the analog voltage, which consists in converting the input analog voltage into positive representations and negative representations of the analog voltage, producing a timed signal of predetermined duration, producing a linear sawtooth voltage starting at the beginning of each timed signal and diminishing linearly in amplitude at a predetermined rate, producing a series of recurring digital count pulses, comparing the positive representations with the sawtooth voltage to produce a first trigger pulse when the sawtooth voltage reaches a critical level, comparing the negative representations with the sawtooth voltage to produce a second trigger pulse when the sawtooth voltage reaches another critical level, and counting the number of recurring count pulses produced in the time interval between the trigger pulses as a digital representation of the magnitude of the analog voltage.

2. The method recited in claim 1 in which the conversion of the analog voltage input to the digital pulse count is rendered substantially independent of temperature changes.

3. In combination, a system for converting a low level analog voltage to a pulse count digit indicative of the magnitude of the analog voltage comprising:

(a) means for producing a timed signal of predetermined time duration including a monostable multivibrator, (b) a linear sweep generator coupled to said timed signal for producing a linear sawtooth voltage starting at the beginning of each timed signal and diminishing linearly in amplitude at a predetermined rate, (c) an amplifier for generating positive and negative voltage magnitudes proportional to the analog voltage to be digitalized, (d) a first comparison circuit having one input coupled to said sawtooth voltage and the other input coupled to said positive voltage magnitude, the output of said comparison circuit producing a first trigger pulse when said sawtooth voltage reaches a critical operation level established by said positive voltage magnitude, (e) a second comparison circuit having one input coupled to said sawtooth voltage and the other input coupled to said negative voltage magnitude, the output of said comparison circuit producing a second trigger pulse when said sawtooth voltage reaches a critical operation level established by said negative voltage, (f) first switch means for converting said first trigger pulse from said first comparison circuit to a gating pulse having time duration occurring simultaneously with said sawtooth voltage, (g) second switch means for converting said second trigger pulse from said second comparison circuit to a gating pulse having time duration occurring during said sawtooth voltage, (h) gating means connected to said first and said second switch means producing an output during the coincidence of said gating pulses, said output of said gating means occurring simultaneously during said sawtooth voltage and having a time duration directly proportional to the magnitude of said analog voltage to be digitalized, (i) a source of recurring count pulses, (j) and means for switching said count pulses occurring during the output of said gating means to a pulse counter whereby said analog voltage is converted to a digital pulse count proportional to the analog voltage.

4. In a system according to claim 3 wherein said first and said second comparison circuits each comprise a pair of emitter coupler emitter-follower amplifiers having base inputs and emitter outputs each having a time of operation independent of each other and occurring substantially after the start of said linear sawtooth voltage.

5. In a system according to claim 4 wherein said first comparison circuit is adjustable to produce said first and said second trigger pulses simultaneously when there is no voltage magnitude input, and zero set means including a potential divider for adjusting the output level of said linear sweep generator providing adjustment of the time of output of said comparison circuits to operate simultaneously.

6. In a system according to claim 5 wherein said zero set means further includes a positive resistance element for temperature compensation of said zero set means.

7. An analog-to-digital converter system for presenting a digital pulse count indicative of the magnitude of an analog voltage input, (a) a source of clock pulses, (b) a monostable multivibrator coupled to said clock pulses and having a timed signal output greater in time duration than a plurality of said clock pulses, (c) a linear sweep generator having a linear sawtooth waveform output timed by said multivibrator, (d) a first comparison circuit, (e) a second comparison circuit, (f) a positive voltage magnitude proportional to the analog signal input connected to said first comparison circuit for producing an output at time Y when said positive voltage magnitude compares critically with said linear sawtooth waveform, (g) a negative voltage magnitude proportional to said analog signal input connected to said second comparison circuit for producing an output at time Z when said negative voltage magnitude compares critically with said linear sawtooth waveform, (h) and gating means connected to said source of clock pulses operable to present to the output of said gating means said clock pulses occurring between the times Y and Z.

8. A temperature compensated time modulated analog-to-digital converter system comprising:

(a) a differential amplifier connected to the input analog voltage to provide a negative and a positive representation of the analog voltage, (b) a linear sweep generator providing linear sawtooth voltage, (c) a first transistorized comparison circuit for comparing said positive representation with the sum of said sawtooth voltage and said negative representation, (d) a second identical transistorized comparison circuit for comparing said negative representation with the sum of said positive representation and said sawtooth voltage, (e) means for generating a start pulse in response to the comparison of voltages in said first comparison circuit, (f) means generating a stop pulse in response to the comparison of voltages in said second comparison circuit, (g) gating means for producing an output during the time duration between said start pulse and said stop pulse, said time duration being directly proportional to said analog voltage, (h) a source of recurring pulses, (i) and means for counting the number of recurring pulses occurring during the output of said gating means, said digital pulse count output being a representation of said input analog voltage.

9. A temperature compensated time modulated analog-to-digital converter system according to claim 8 wherein said gating means includes means for detecting when said start pulse occurs after said stop pulse indicative of an input analog voltage polarity change and means for producing said output during the time duration between said stop pulse and said start pulse.

10. A temperature compensated time modulated comparison circuit system comprising:

(a) a first transistor amplifier having a positive representation of an analog voltage to be measured connected across its first and its second electrodes, (b) a second transistor amplifier having a linear sawtooth voltage to be compared with said analog voltage connected across its first and its second electrodes, (c) a first tunnel diode connected in series between said second electrodes of said first and said second amplifiers, (d) means connected to said first tunnel diode responsive to a predetermined voltage drop across said first tunnel diode generating a start pulse at the time of comparison, (e) a third transistor amplifier having a negative representation of an analog voltage to be measured connected across its first and its second electrodes, (f) a fourth transistor amplifier having said linear sawtooth voltage to be compared with said analog voltage connected across its first and its second electrodes, (g) a second tunnel diode connected in series between said second electrodes of said third and said fourth amplifiers, (h) and means connected to said second tunnel diode responsive to a predetermined voltage drop across said second tunnel diode generating a stop pulse at the time of comparison, said time duration between said start pulse and said stop pulse being independent of current variations due to temperature changes in said amplifiers and directly proportional to analog voltage to be measured.

11. In a temperature compensated time modulated comparison circuit system according to claim 10 which further includes a differential amplifier for amplifying the analog voltage to be measured and producing said positive and said negative representations of said analog voltage to be measured.

12. In a temperature compensated time modulated comparison circuit system according to claim 11 which further includes a source of constant frequency pulses connected to gating means operated by said start and said stop pulses to produce a train of pulses at an output display device during said time duration directly proportional in number to said analog voltage.

13. A temperature compensated comparison circuit comprising:

(a) a first transistor amplifier having an analog voltage to be measured connected across its first and its second electrodes, (b) a second transistor amplifier having a linear sawtooth voltage to be compared with said analog voltage connected across its first and its second electrodes, (c) a tunnel diode connected in series between said second electrodes of said amplifiers, (d) and means connected to said tunnel diode for determining when a predetermined voltage drop across said tunnel diode has occurred, said voltage drop being compensated for variations between said first and said second electrodes.

14. A temperature compensated comparison circuit comprising:

(a) a first transistor having emitter and base electrodes defining an amplifier input electrode system, (b) a second transistor having emitter and base electrodes defining an amplifier input electrode system, (c) a linear voltage-current responsive device connected in series between the emitters of said first and said second transistors, (d) said base of said first transistor being connected to an analog voltage to be measured, (e) said base of said second transistor being connected to a linear sawtooth waveform to be compared with said analog voltage, (f) and means for generating an output signal when a predetermined voltage occurs across said linear voltage device connected between the emitters of said first and said second transistors, said predetermined voltage being independent of the base-emitter temperature-current variations of said transistor amplifiers.

References Cited

UNITED STATES PATENTS 3,258,764 6/1966 Muniz et al. ________ 340—347

DARYL W. COOK, *Acting Primary Examiner.*

MAYNARD R. WILBUR, *Examiner.*

A. L. NEWMAN, *Assistant Examiner.*